United States Patent [19]
Longacre, Jr. et al.

[11] Patent Number: 5,463,214
[45] Date of Patent: Oct. 31, 1995

[54] APPARATUS FOR OPTIMIZING THROUGHPUT IN DECODED-OUTPUT SCANNERS AND METHOD OF USING SAME

[75] Inventors: Andrew Longacre, Jr., Skaneateles; Robert M. Hussey, Syracuse; John M. Pidhirny, Skaneateles, all of N.Y.

[73] Assignee: Welch Allyn, Inc., Skaneateles Falls, N.Y.

[21] Appl. No.: 205,539

[22] Filed: Mar. 4, 1994

[51] Int. Cl.$^6$ .................................................... G06F 7/10
[52] U.S. Cl. ........................................... 235/472; 235/462
[58] Field of Search ..................................... 235/472, 462

[56] References Cited

U.S. PATENT DOCUMENTS 4,387,297  6/1983  Swartz et al. ............................ 235/472
4,570,057  2/1986  Chadima et al. ......................... 235/472
5,196,684  3/1993  Lum et al. .
5,218,191  6/1993  Chadima, Jr. et al. .

FOREIGN PATENT DOCUMENTS 54-24543  2/1979  Japan .

Primary Examiner—Harold Pitts
Attorney, Agent, or Firm—Harris Beach & Wilcox

[57] ABSTRACT

A method of improving throughput in a scanner whose scanning action is capable of being stopped and started instantly, comprising the steps of A) storing results of a first scan of a target containing indicia in a first region of a memory and B) upon determining that the first scan is complete 1) decoding results of the first scan 2) initiating a second scan, 3) storing results of the second scan of the target containing indicia in a second region of a memory, and 4) awaiting completion of the decoding before initiating an additional scan.

8 Claims, 4 Drawing Sheets

APPARATUS FOR OPTIMIZING THROUGHPUT IN DECODED-OUTPUT SCANNERS AND METHOD OF USING SAME

BACKGROUND OF THE INVENTION

1. Field of the Invention

This invention relates to decoded-output scanners and, more particularly to optimization of throughput of decoded-output instantaneously stoppable scanners, by coupling together the scanning and the decoding processes.

DESCRIPTION OF THE PRIOR ART

Optical scanners, generally, and in particular bar code scanners perform the function of transferring specially formatted visual patterns into electrical signals which are indicative of the visual patterns scanned. This is true whether the visual pattern is presented linearly—as in a single dimensional bar code, or in two dimensions as in two dimension bar code or as OCR characters. Decoded-output scanners perform the additional function of interpreting or decoding these signals, and obtaining meaningful information therefrom. This is performed by an associated decoder which may or may not be integral to the scanner. The output of the system, then, is the result of both scanning and decoding.

In the prior art, decoded-output scanners, whether of the type where the scanning process involved no physical motion or momentum or of other types, operate at a set repeat rate. That is to say the scanners are set so as to perform some fixed number of scans during a given time period. This generally ranges between 30 and 200 scans/sec. The decoding function or decoders of the prior art synchronize with the scanning. That is to say that the scanning proceeds at the predetermined fixed rate and the information collected by the scanners is decoded by the decoder in a parallel process. It sometimes happens, however, that a large number of visual elements are encountered by the scanner. If information is therefore collected more rapidly than it can be decoded, a point will be reached where there is insufficient storage for the accumulated but not yet decoded data. This is especially likely to occur when the indicia being scanned contain large amounts of information as may happen in the case of OCR or two dimensional bar code. Various schemes have been used to handle this situation, but all involve the discarding of data. Obviously the data will then need to be recollected. There is, however, no discrimination as to which data is collected on a repeat scan. Thus, already decoded data may be collected repeatedly with a net result that the scanning process is slowed.

The instant invention solves this problem by making the operations of scanning and decoding interdependent, operating so that neither operation can outstrip the other. This is especially effective for scanners whose operation can be stopped and started instantaneously. CCD scanners, in particular, are amenable to use according to the instant invention because their scanning involves no physical motion or momentum.

SUMMARY OF THE INVENTION

It is therefore a primary object of the present invention to provide optimal throughput in decoded-output optical scanners.

It is another object of the present invention to provide optimal throughput in optical scanners that can be stopped and started instantaneously.

It is still another object of the present invention to provide optimal throughput in CCD based optical scanners.

It is a further object of the present invention to provide optimal throughput in CCD based bar-code scanners.

It is still a further object of the present invention to provide optimal throughput in two-dimensional CCD based bar-code scanners.

It is yet another object of the present invention to provide a decoded-output optical scanner where the scanning function waits until decoding of an earlier scan has been completed.

These and other objects of the present invention are attained by a method of improving throughput in a scanner whose scanning action is capable of being stopped and started instantly, comprising the steps of A) storing results of a first scan of a target containing indicia in a first region of a memory and B) upon determining that the first scan is complete 1) decoding results of the first scan 2) initiating a second or subsequent scan 3) storing results of the second scan of the target containing indicia in a second region of a memory, and 4) awaiting completion of the decoding before initiating an additional scan.

BRIEF DESCRIPTION OF THE DRAWINGS

For a better understanding of these and other objects of the present invention, reference is made to the detailed description of the invention which is to be read in conjunction with the following Drawing, wherein.

DETAILED DESCRIPTION OF THE INVENTION

Figure 1:
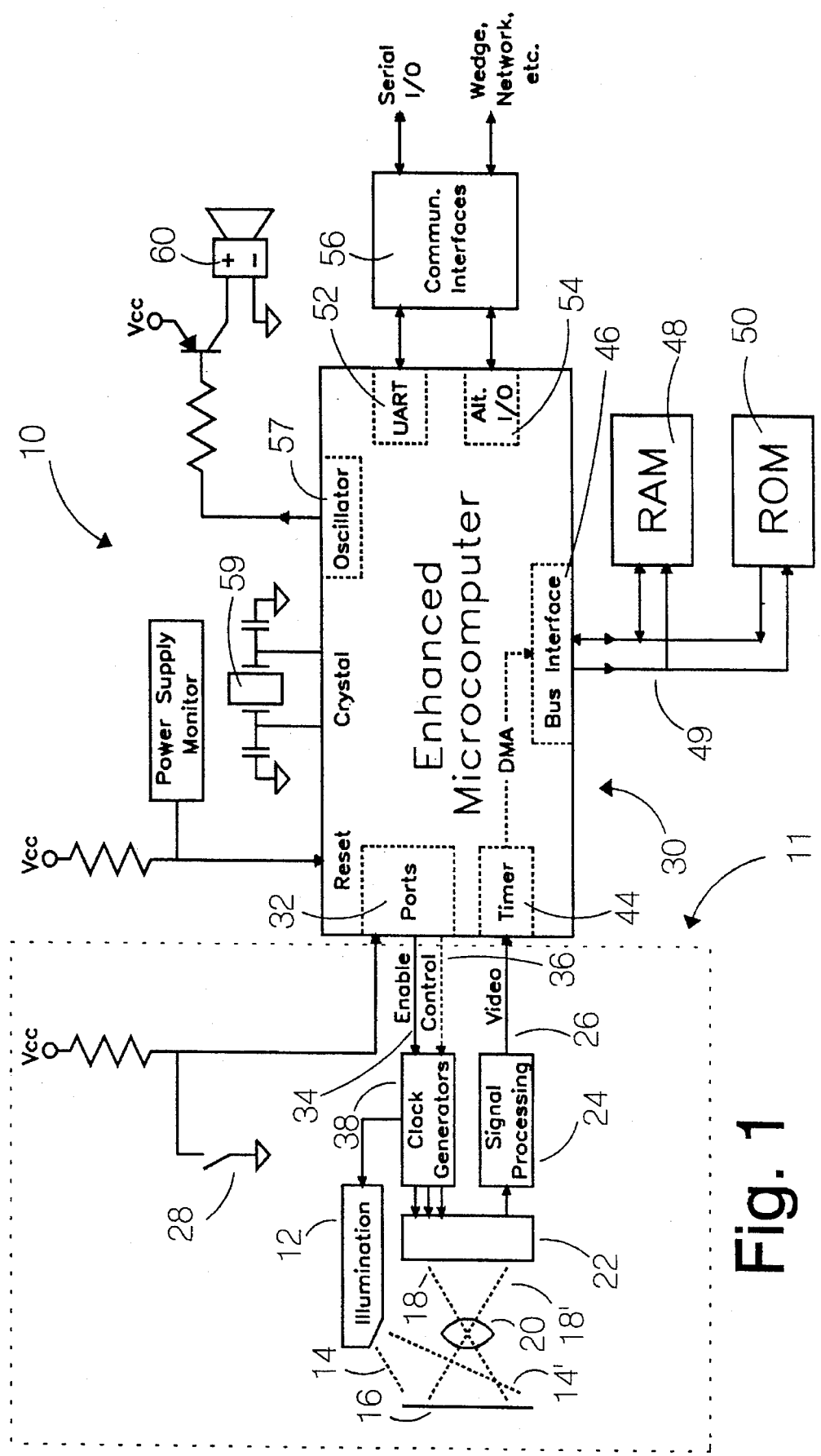
FIG. 1 is a block diagram representing the elements that constitute a decoded-output CCD scanner.

Turning now to the Drawing and particularly, FIG. 1 thereof, there is seen a block diagram of a system 10 that embodies the teachings of the present invention. System 10 includes a scanning section 11, which is enclosed by the dotted line at the left side of FIG. 1, Illuminator 12, which can be an LED array, a laser, or the like, produces a light beam represented by outer defining rays 14, 14'. The beam strikes a target 16 on which are found visible indicia, such as one or two dimensional bar code or OCR characters. The light beam is reflected through optics 20, the reflected beam being shown representatively as rays 18, 18'. The optics project an image of the indicia onto image sensor 22, which is preferably realized as a CCD array or matrix. Signals developed by the image sensor 22 responsive to light incident thereon are conducted through signal processing electronics 24, and a suitably conditioned video signal 26 is presented to an enhanced microcomputer or microprocessor 30.

Operation of the scanning section 11 is controlled by a trigger 28, which can be a manual trigger, or an automatic trigger that responds to the presence of indicia. The trigger 28 is coupled to the microcomputer 30 via an I/O port section 32. The microcomputer asserts an enable signal 34 responsive to the trigger 28 to turn on the illuminator 12 and the image sensor 22. Control signals 36 are provided for clock generators 38 that provide suitable enabling signals for the illuminator 12, and clock signals 42 for the image sensor 22 as are required for the operation of a CCD device.

The microcomputer is provided with a timer and DMA controller 44. The video signal is conducted through a bus interface 46 onto bus 49, and then stored as data at an address in a RAM 48, the transfer mediated by the DMA controller 44. The stored data is representative of the optical pattern of the indicia on the target 16. While DMA access to the RAM is preferred for rapidity of operation, other memory addressing techniques can be also used. Other conventional provisions include a UART 52 and an auxiliary I/O port section 54 for connecting communications devices (not shown) to the scanner. Representative of such devices are a keyboard when the scanner is employed in a wedge configuration, a telecommunications network, and other devices as may be required for a given application of the system.

A ROM 50 contains system programs, and may also contain a program for decoding the data stored in the RAM 48. Of course the program could equivalently reside in RAM 48, and be loaded therein from a secondary memory storage (not shown), or via communications interface 56.

In this particular embodiment as shown, the decoder is integrated into the scanner, although it could also be external thereto.

Figure 2:
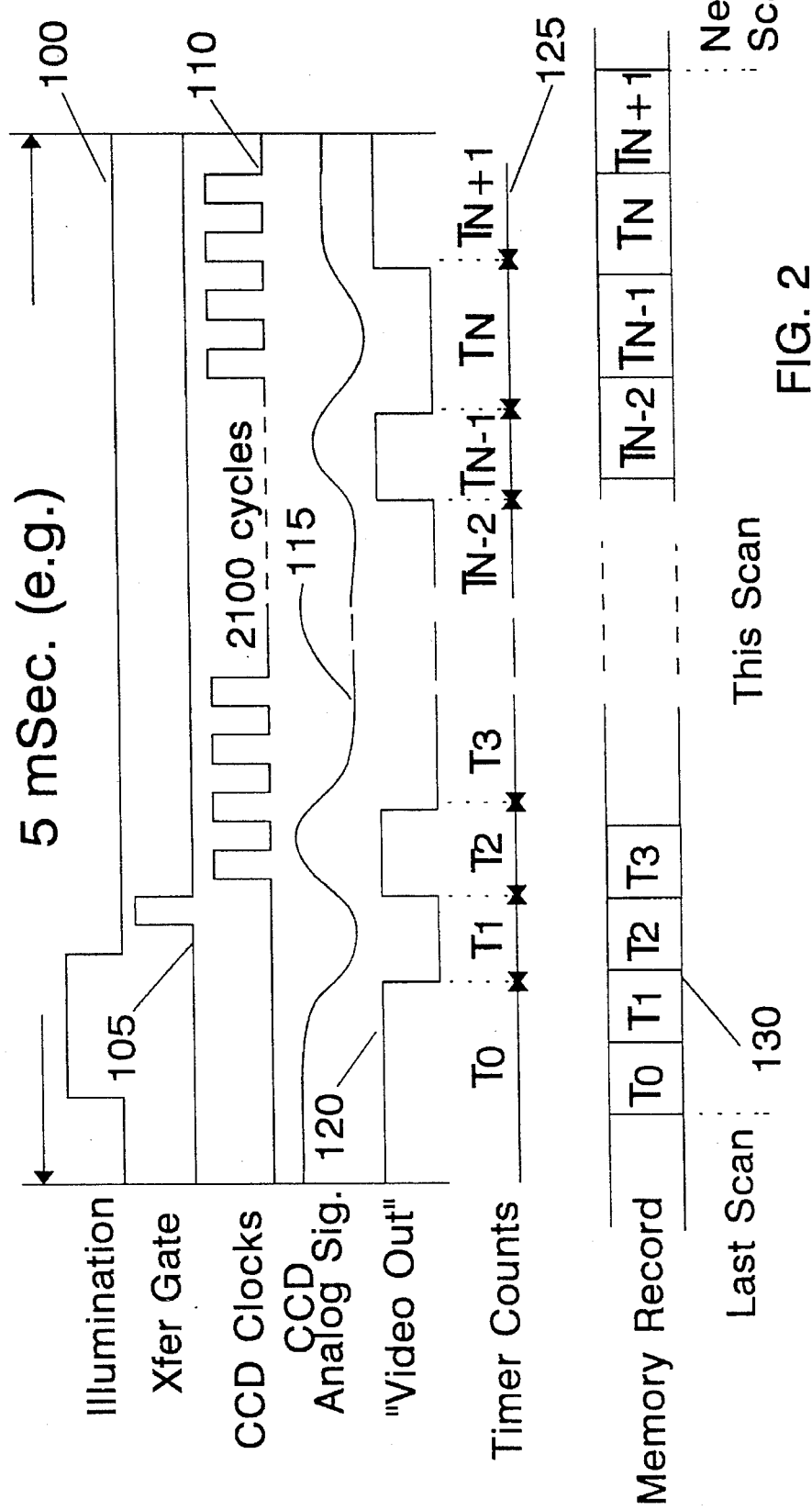
FIG. 2 shows a representative CCD scan cycle.

A typical scan cycle for a CCD scanner is shown in FIG. 2. During the time period of the scan (5 msec is used in the figure, although this can vary) the cycle begins with illumination pulse 100 during which brief time period the target is illuminated. The target may contain bar code or any other indicia such as OCR which are amenable to scanning and decoding. During the illumination pulse 100 period, photosensors in the scanner obtain a linear image of the target which is then transferred via a transfer gate 105 to the charge coupled device. The CCD is clocked with pulses 110 to shift the image out to a CCD analog signal 115. The CCD analog signal 115 is then transformed via the microprocessor to a digitized signal termed video out 120 in FIG. 2. Video out 120 is a digitized representation of whatever high contrast elements were observed during the illumination period 100. This could be the black regions of a bar code, for example. It can be seen that there is not regularity to either the size or the placement of the '1' and '0' segments of the video out 120.

The time between successive leading and trailing edges of the video out signal 120 is then timed using the microprocessor clock counts 125 as reference. Next the information is then stored in memory 130.

Figure 3:
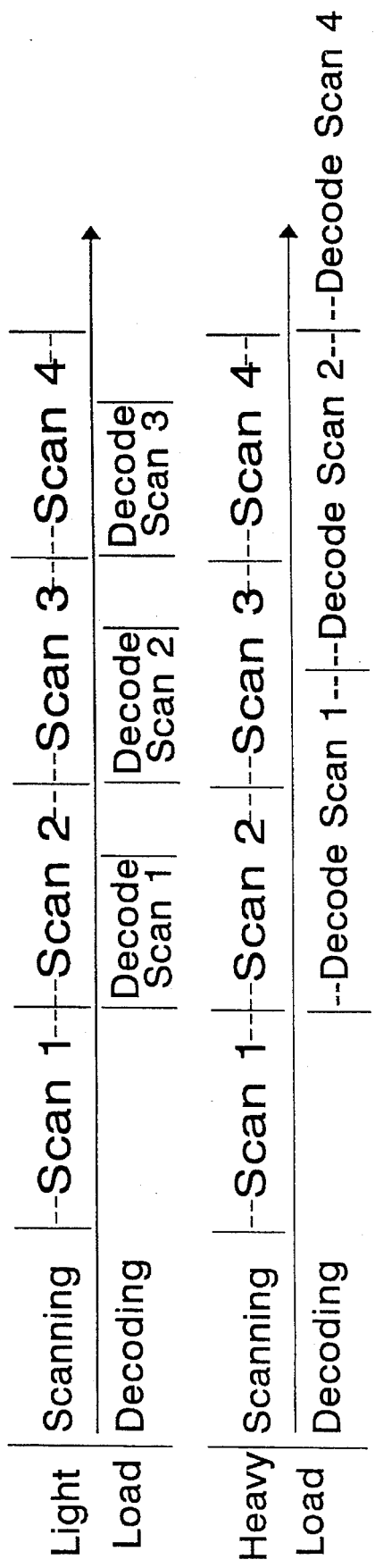
FIG. 3 shows schematically the operation of the prior art and the instant invention in scanning under different load conditions.
Figure 3:
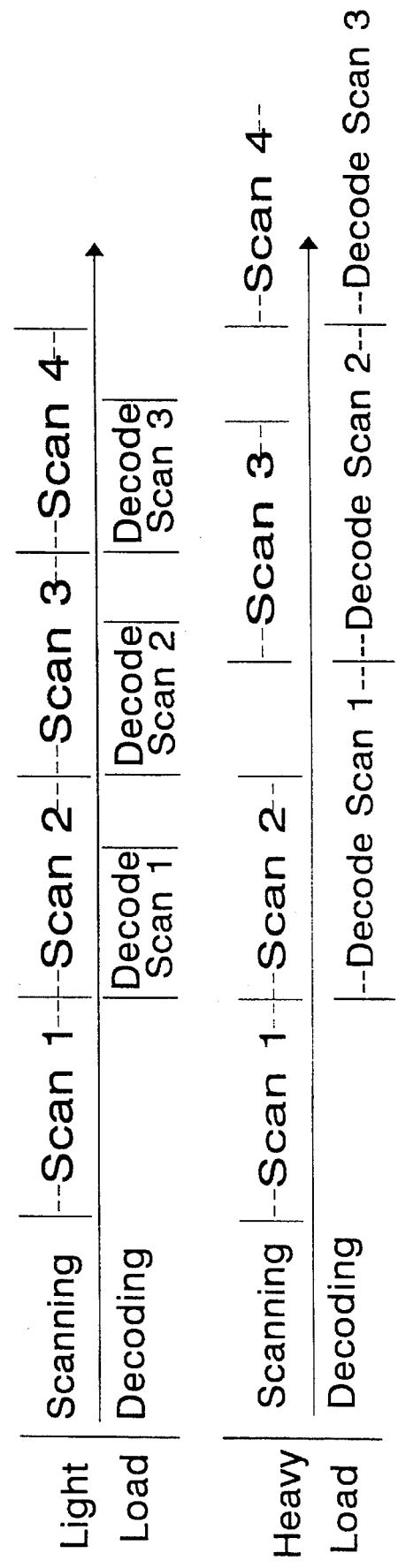

Scanning of indicia can take place under either of two generalized conditions with respect to the information load presented by the indicia. These are there being a light load of information or a heavy load thereof. The situation is set forth in FIG. 3. The prior art and the instant invention perform equally well under a light load. This can be seen by inspecting the representation of the timing of successive scans and decoding operations of prior art 135 and the instant invention 155 under a light information load. Each decode of a previous scan's information can be completed during a subsequent scan.

However, under a heavy information load it can be seen that the prior art methods 140 did not allow sufficient time for decoding. Thus, for the method illustrated, after scan1 141 is completed scan2 142 is initiated immediately before the decoding of scan1 143. Scan2 142 is completed while decode1 143 is still in progress and so scan3 144 is initiated. The decoding process falls further and further behind the scanning process until some point where memory is filled and information must be discarded.

This contrasts with the heavy information load handling of the instant invention 160. Again scan1 161 obtains and stores information in memory. Then scan2 162 is initiated immediately before the decoding of scan1 165 is begun. However when scan2 162 is terminated, the decode 163 is not yet completed. Therefore the scanner is halted at 170 and only restarted at 171 to perform scan3 164 when the decode of scan1 163 is completed. Of course immediately after scan3 164 is initiated, so is the decoding of scan2 165.

Figure 4:
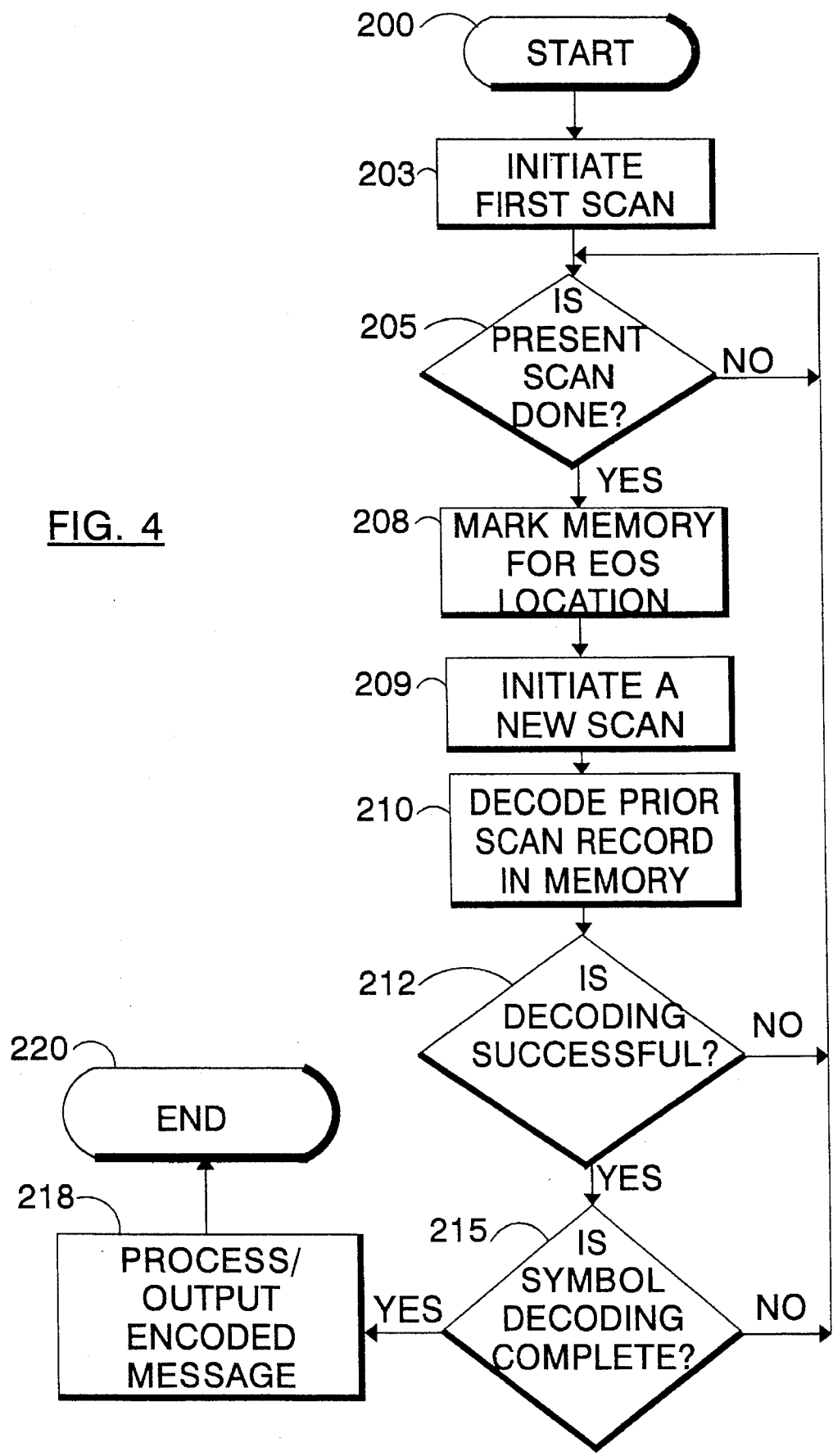
FIG. 4 is a flow diagram showing the preferred embodiment of the instant invention.

FIG. 4 shows the steps used to accomplish this synchronization of scanning and decoding so that information does not have to be discarded from memory. The scanning process as a whole is initiated in step 200 by an act such as turning on the power to the scanner or depressing a button or other trigger to initiate the illumination. The first scan is then initiated in step 203. This first scan is a special instance as it is the one time, under normal circumstances, that a scan will be initiated without a decoding operation being initiated as well. After this step 203 the succeeding steps are repeated from one cycle to the next.

First a determination is made as to whether the present scan is complete 205. This is accomplished via a signal from the scanner to the microprocessor informing the microprocessor that the scan is complete. The signal may either be initiated by the scanner or be a response to a query signal from the microprocessor. Once the scan is complete, and the information garnered from the scan has been placed in RAM memory, then in the preferred embodiment the last memory location containing information from the previous scan is marked in step 208. This can be done using timing information with respect to the last scan. In this embodiment memory is handled as a circular queue (with each region logically successive to both the prior and subsequent regions of memory) so as to maximize the use of memory, as only the amount needed for each scan is used by it. However storage of the information can take place using two predetermined blocks of memory where each block is of sufficient size to accommodate the greatest possible information obtainable from a single scan. The information from the scan may have been transferred to memory by any of the techniques that are well known in the art such as, for example, direct memory access.

A new scan is then initiated in step 209 and thereafter the microprocessor begins, in step 210, decoding the results from the prior scan that are already completely stored in memory. A determination is then made under microprocessor control in step 212 as to whether the symbol decoding is successful. This query breaks into two parts: first has the decoding been completed and second has the last collection of information been decoded so as to obtain a valid symbol? If the decoding is not complete then no new scan is initiated until such time as it is complete—that is initiation of scanning will be prevented. If however the decoding is complete but does not yield a valid results, then the information will have to be discarded and the system will return to wait for the present scan to be completed.

If, on the other hand, a valid decode has been accomplished, then a determination will be made in step 215, again under microprocessor control, as to whether the entire group of scans has successfully decoded a complete symbol or informational grouping. If not, the system will wait for the completion of the current scan. If so, then in step 218 the completed group of scans comprising a message will be processed and/or output as directed by the microprocessor using the peripherals which are attached to the system. The process will then end in step 20 by either having the power disconnected or the button or trigger for illumination released.

It can be seen that by practicing this invention information is decoded at a rate that keeps up with the scanning process so that no discarding of stored information due to memory constraints is ever necessary.

While this invention has been explained with reference to the structure disclosed herein, it is not confined to the details set forth and this application is intended to cover any modifications and changes as may come within the scope of the following claims:

What is claimed is:

1. In a scanner whose scanning action is capable of being stopped and started instantly, and having associated therewith a microprocessor for controlling the scanner in its performance of a scanning process, the improvement comprising:

scanning means for scanning a target containing indicia to obtain information therefrom;

initiating means for triggering said scanning means, said scanning means being responsive to a signal from said initiating means;

first memory means for retaining information transferred therein from said scanning means during a first scan;

completion indicating means responsive to a signal from said scanning means, for determining that the first scan is completed;

decoding means, responsive to said completion indicating means, for decoding information from the completed first scan;

halting means, responsive to said completion indicating means, for preventing initiation of a subsequent scan by said scanning means; and second memory means for retaining information transferred therein from said scanning means during a second scan wherein said scanning means and said decoding means are simultaneously operable.

2. The apparatus of claim 1 further comprising:

timing means responsive to a signals from said scanning means for timing a duration of the first scan;

marking means responsive to a signal from said timing means that the first scan has been completed, for demarcating said first memory means.

3. The apparatus of claim 2 wherein said second memory means is located logically successive to said first memory means.

4. The apparatus of claim 3 wherein said second memory means is immediately adjacent said first memory means.

5. The apparatus of claim 1 wherein said scanner is a CCD scanner.

6. The apparatus of claim 1 further comprising:

detection means, responsive to a signal from said decoding means, for detecting that the target has been fully scanned and decoded; and termination means, responsive to a signal from said detection means, for terminating a scanning process.

7. The apparatus of claim 1 comprising further direct memory access means for transferring information directly from the scanner to said first and second memory means.

8. In a bar-code scanner which reads two-dimensional bar code and whose scanning action is capable of being stopped and started instantly, said scanner having associated therewith a microprocessor for controlling the scanner in its performance of a scanning process, the improvement comprising:

scanning means for scanning in two dimensions a target containing indicia to obtain information therefrom;

initiating means for triggering said scanning means, said scanning means being responsive to a signal from said initiating means;

first memory means for retaining information transferred therein from said scanning means during a first scan;

completion indicating means responsive to a signal from said scanning means, for determining that the first scan is completed;

decoding means, responsive to said completion indicating means, for decoding information from the completed first scan;

halting means, responsive to said completion indicating means, for preventing initiation of a subsequent scan by said scanning means; and second memory means for retaining information transferred therein from said scanning means during a second scan wherein said scanning means and said decoding means are simultaneously operable.

* * * * *